Figure 7:
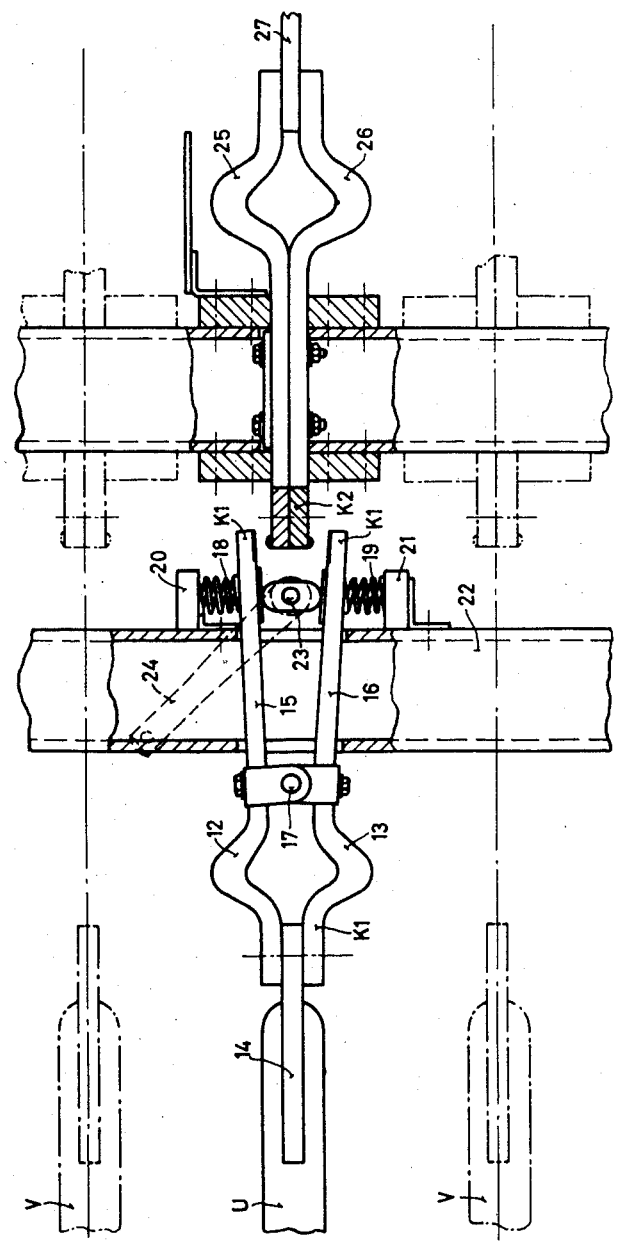

Nov. 3, 1959
H. HOFFSTÄTTER
2,911,542
ALTERNATING-CURRENT CONTROL SYSTEM FOR
HIGH-POWER RESISTANCE FURNACES
Filed May 1, 1958
3 Sheets-Sheet 1
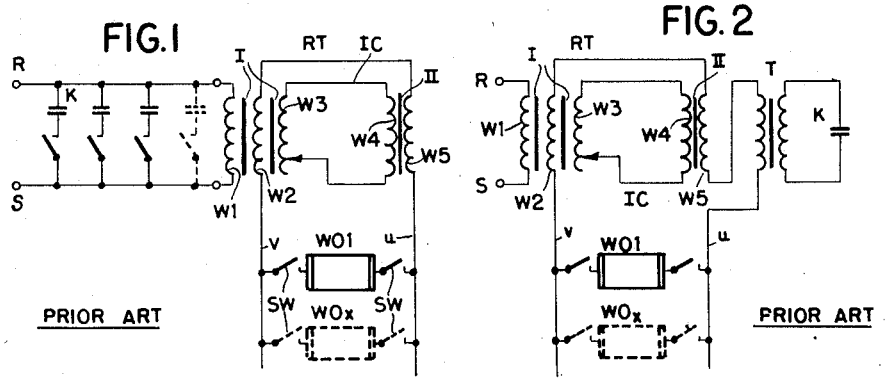
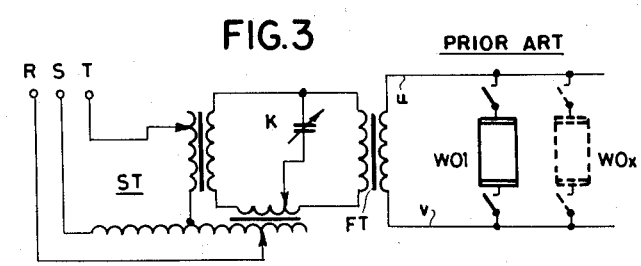
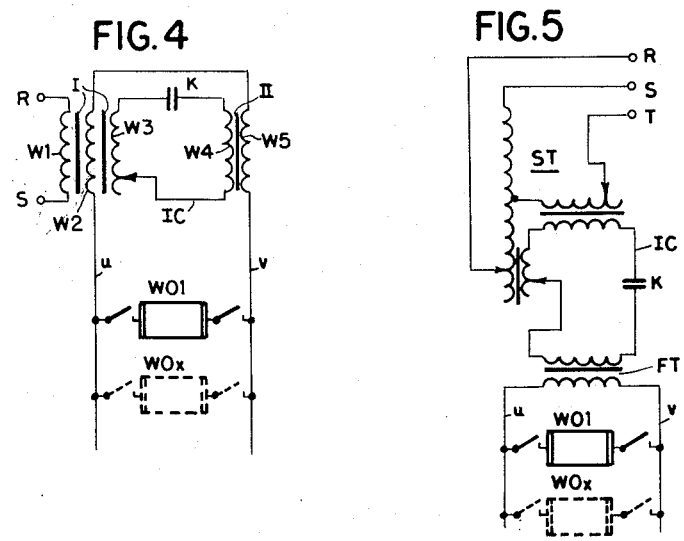

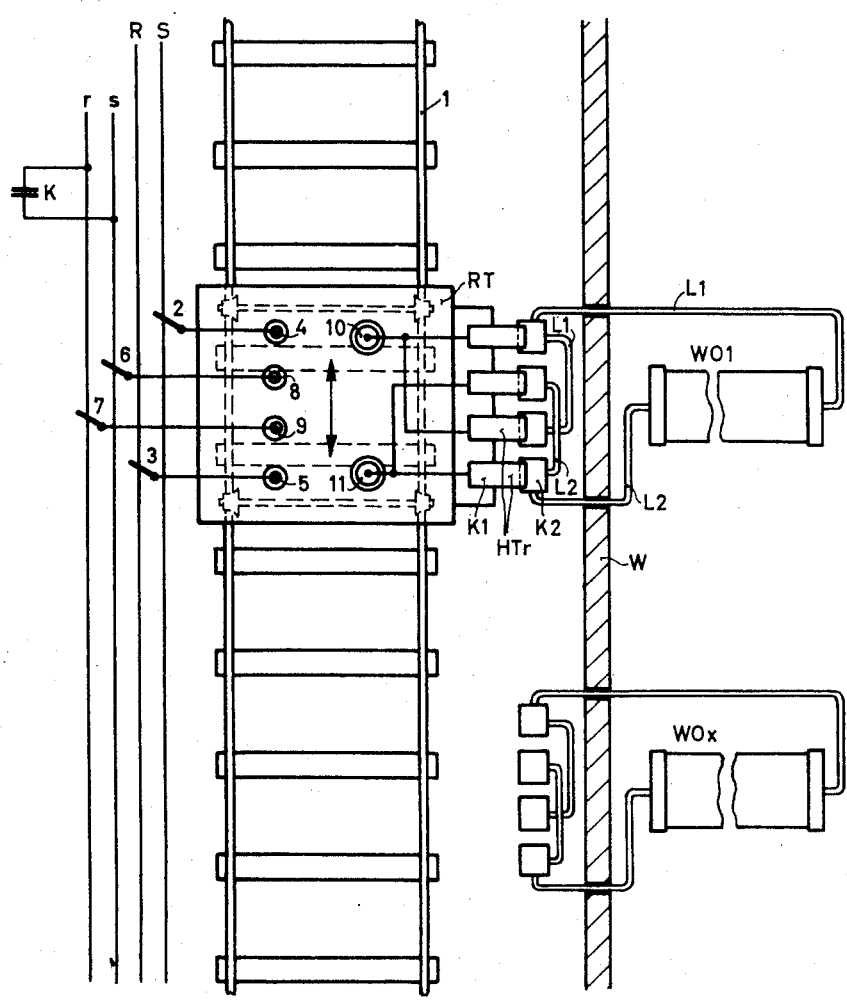

Nov. 3, 1959

H. HOFFSTÄTTER 2,911,542

ALTERNATING-CURRENT CONTROL SYSTEM FOR
HIGH-POWER RESISTANCE FURNACES

Filed May 1, 1958

3 Sheets-Sheet 3

United States Patent Office 2,911,542
Patented Nov. 3, 1959

2,911,542

ALTERNATING-CURRENT CONTROL SYSTEM FOR HIGH-POWER RESISTANCE FURNACES

Heinz Hoffstätter, Meitingen, near Augsburg, Germany, assignor to Siemens-Planiawerke Aktiengesellschaft für Kohlefabrikate, Meitingen, near Augsburg, Germany, a corporation of Germany Application May 1, 1958, Serial No. 732,329

Claims priority, application Germany May 24, 1957

7 Claims. (Cl. 307—38)

My invention relates to systems for controlling the supply of alternating current to heavy-duty resistance furnaces, for example those used in electro-graphite producing plants where the carbon bodies to be graphitized are heated by directly passing therethrough a low-voltage current of very high amperage.

The invention will be described hereinafter with reference to the drawings in which:

Figs. 1, 2 and 3 are explanatory circuit diagrams corresponding to prior art;

Figs. 4 and 5 are schematic circuit diagrams of two embodiments of furnace control systems according to the invention; and Figs. 6 and 7 show structural details of systems as shown in Figs. 4 and 5.

The resistance furnaces in graphitizing plants are mostly operated in time sequence. In known plants of this type, the individual furnaces are of elongated shape, more than 10 meters long, and are operated by single-phase alternating current of about 50,000 amps. Current is supplied to the furnaces by bus-bar equipment which must be designed and rated for the high current loading and hence involves a great investment. Large energy losses occur in the bus bars in form of heat which must be dissipated by air cooling. Since the resistance of the furnace varies during graphitizing of the shaped carbons, the voltage impressed upon the furnace must be regulated. This is done by means of a regulating transformer. It is known to connect a number of capacitors in parallel relation to the high-voltage side of the regulating transformer for compensating the reactive wattless current resulting from the inductivity of the loop circuit formed by the furnace and the bus bar. The capacitors must be connected to, and disconnected from, the circuit from time to time, depending upon the varying amount of wattless power required by the graphitizing furnaces.

As shown schematically in Fig. 1, the regulating transformer RT in the known system comprises two mutually independent iron cores I and II. Core I is provided with a high-voltage primary winding W1 connected to the alternating-current line terminals R, S. The same core I carries a high-current low-voltage secondary winding W2, as well as a third winding W3 which has a number of tap points, here schematically represented simply by a slide contact, for the purpose of regulating the voltage in the high-current load circuit of the transformer. The third winding, called "intermediate winding" forms part of an "intermediate circuit" IC which also includes, in series, an intermediate winding W4 on the second core II. Core II also carries a high-current winding W5 for superimposing a controllable additional voltage upon the voltage produced in high-current winding W2 of core I. In this manner, the voltage across the output leads $u$, $v$ of the high-current windings is regulatable within a wide range. This regulatable voltage is applied through switches SW to the resistance furnaces WO1 to WO$x$. Compensation of wattless power is effected on the high-voltage primary side of the regulating transformer by means of a group of selectively insertable capacitors K. Consequently, the regulating transformer passes active power as well as reactive power, so that a correspondingly large design and rating are required.

Considerably more favorable conditions are obtained by using a series-connected capacitor instead of parallel capacitors, because the wattless power of a series capacitor is dependent upon the current and hence varies together with a change in loading, whereas with parallel capacitors the wattless power is constant for a given capacitance and line voltage.

The use of such a series capacitor has become known in a system as shown in Fig. 2. This system also comprises a regulating transformer with two cores I and II. Core I carries the high-voltage primary winding W1 connected to line terminals R and S, also a high-current secondary winding W2, and an intermediate winding W3 with regulatable or selectively applicable taps which are connected to the intermediate circuit winding W4 of the second core II. Core II also carries a high-current winding W5. Connected in series with the two high-current windings W2 and W5 is a series transformer T through which a series capacitor K is indirectly connected with the high-current load circuit.

While a series-capacitor system according to Fig. 2 automically affords reactive power regulation, thus eliminating the additional switches required in a parallel-capacitor system, the series-capacitor system has the disadvantage of requiring a larger and expensive bus bar equipment if several furnaces are to be operated from the same transformer equipment. This is so because the combination of the regulating transformer with the series transformer becomes too large to permit being moved from one to another furnace.

Relating to furnace energizing generally of the above-mentioned type, it is an object of my invention to secure the advantages of a series-capacitor but to eliminate the necessity for adding a series transformer, thus achieving the desired result with simpler and less space-demanding means than heretofore available. It is another object of my invention to make a series-capacitor regulating system applicable for any desired number of furnaces but to avoid or minimize the requirement for high-duty bus-bar installationing between the furnaces and the regulating transformer.

To this end, and in accordance with one of the features of my invention, I connect a series capacitor into the loop circuit that interconnects the two intermediate windings of the regulating transformer.

This feature is apparent from the embodiment illustrated in Fig. 4. The control system comprises the above-described regulating transformer with two cores I and II. Core I carries the high-voltage primary winding W1 connected to the alternating current line terminals R, S and is further provided with a high-current secondary winding W2 and an intermediate winding W3. Core II carries an intermediate winding W4 and a high-current secondary winding W5. Windings W2 and W5 are serially connected with the load circuit to provide a low output voltage across bus leads $u$ and $v$. The capacitor K, usually consisting of a battery of individual capacitor members, is connected in series between the intermediate windings W3 and W4.

If a number of furnaces are to be energized through the regulating transformer in time sequence, the regulating transformer, according to another feature of the invention, is made transportable whereas the capacitor battery is stationarily mounted.

According to a further feature of my invention, the current-transmitting connection between the mobile regulating transformer and the furnace head is effected through a disconnect switch whose movable contact parts are mounted on the traveling regulating transformer. The stationary capacitor battery is connected to an auxiliary bus which inserts the capacitor battery through disconnect switches of the regulating transformer into the loop circuit of the two intermediate windings of the regulating transformer, as will be more fully described below with reference to Figs. 6 and 7.

The invention is also applicable for industrial plants with high-current resistance furnaces energized through a three-phase transformer in Scott connection.

Such a Scott connection is schematically shown in Fig. 3 where it is denoted by ST. In other respects the system of Fig. 3 is comparable to that described above with reference to Fig. 1.

A Scott-connected system as show in Fig. 3 permits simultaneous compensating and symmetrizing, the capacitor battery of regulatable capacitance being used both for compensating and symmetrizing purposes. In the known systems of this type, the capacitor battery K is connected parallel to the furnace transformer proper, this transformer being denoted by FT in Fig. 3.

When applying my invention to a Scott-connected furnace control system, however, the capacitor K must be connected serially into the intermediate circuit of the regulating transformer ST as is shown in Fig. 5 which otherwise is in accordance with the system already described with reference to Fig. 4. The capacitor battery K in the system of Fig. 5 is self-regulatable with respect to its wattless power and hence does not require the capacitance-controlling switching devices symbolically illustrated in Fig. 3 and more fully shown in Fig. 1.

It is known as such to make the regulating transformer in graphitizing plants transportable for the purpose of moving it to the particular resistance furnace to be operated at a time, and then electrically connecting the transformer with that one furnace. As mentioned, however, it is difficult and impracticable to provide for such mobility in the known systems using a series capacitor. In contrast thereto, the series capacitor connected in accordance with the present invention does not interfere with the ease and convenience of making the regulating transformer transportable.

Furthermore, in order to facilitate moving the regulating transformer from furnace to furnace and to reduce the time required for the change in connection, the present invention, according to another feature, substitutes the heretofore customary screw connection by the above-mentioned high-current disconnect switches whose movable parts are located on the transformer assembly, whereas the individual furnaces are provided only with stationary contact parts that can selectively cooperate with the movable switch members.

The provision of such a high-current disconnector according to the invention affords considerable economical advantages. This will be understood if one considers that, for loosening and reconnecting the screw connections heretofore used, a period of at least 2½ hours was necessary. In contrast thereto, the time required for displacing the regulating transformer and changing the connections by means of the high-current disconnectors can be reduced to approximately 20 minutes. Consequently, for approximately one-hundred furnace runs per year, a total of two-hundred hours are saved.

An embodiment of a graphitizing furnace plant comprising a control system according to Fig. 4 or Fig. 5, and equipped with a high-current disconnector for the regulating transformer and with a disconnector for the capacitor battery, will be described presently with reference to Figs. 6 and 7.

Fig. 6 shows schematically a top view of a portion of the plant. The plant is equipped with a number of graphitizing furnaces of which only two are shown at WO1 and WOx. The regulating transformer RT is mounted on a wheeled carriage running on rails 1 along the entire group of furnaces. Mounted along the high-voltage side of the regulating transformer are the high-voltage buses R and S which carry high voltage, for instance of 11 kv. Mounted parallel to these buses are auxiliary buses r, s, to which the stationary capacitor battery K is connected. Two high-current disconnector switches 2 and 3 are mounted on the carriage and are connected with the regulating transformer RT through respective insulating bushings 4 and 5. The capacitor battery K is connected serially into the intermediate circuit (not shown in Fig. 6 but corresponding to Fig. 4 or Fig. 5) through disconnect switches 6 and 7 which are likewise mounted on the regulating transformer assembly. Hence the switches 6, 7 travel together with the transformer and glide along the high-voltage auxiliary buses r, s thus completing, when closed, an electric connection between the auxiliary buses r, s and the intermediate circuit of the regulating transformer RT. The insulating bushings through which the disconnectors 2 and 3 are connected with the intermediate circuit are denoted by 8 and 9. Located at the low-voltage side of the regulating transformer RT are the movable contact members K1 of the high-current disconnector HTr more fully shown in Fig. 7 and described below.

Since the high-current disconnector is traversed by current of great intensity, a multiplicity of individual contacts K1 are provided. Those contacts are located beside and beneath one another, and are all electrically connected in parallel as is shown schematically in Fig. 6. The connections or insulating bushings for the high-current disconnector of the regulating transformer are denoted by 10 and 11.

The fixed contact members K2 of the high-current disconnector for each individual furnace are mounted in front of the furnace building so as to be in a mating position relative to the movable contact members K1 of the travelling transformer assembly. Care must be taken for good cooling of the high-current disconnector. Used for this purpose are cooling-water lines L1 and L2 which simultaneously serve to supply current to the respective furnaces WO1—WOx. The transformer shed is separated from the furnace building by a wall W. The disconnect switches 2, 3 and 6, 7 as well as the high-current disconnectors HTr cannot be switched under load, but are opened or closed only when the entire electric system is not under voltage.

As shown more in detail in Fig. 7, the high-current disconnector comprises a multiplicity of movable contact members which are mounted on the assembly of the regulating transformer RT. Fully shown in Fig. 7 is a contact member U relating to the low-voltage phase u (Figs. 4, 3). The contact member is provided with a pincer-like mechanism of contact levers with flexible current-supply straps 12, 13 connected to the fixed contact bar 14 of the regulating transformer. The other ends of the straps are attached to respective contact levers 15 and 16 pivotally joined together by a hinge pin 17. The two levers 15 and 16 are subjected to the action of two pressure springs 18, 19 which brace themselves against respective bracket plates 20, 21 mounted on the supporting frame or carriage structure 22 of the regulating transformer.

Located between the two levers 15, 16 is a cam shaft 23 to be driven by a motor (not illustrated) or manually by a lever 24. The cam shaft 23 is turned in one or the other direction by an angular amount of about 45°, depending upon whether the two contact levers 15, 16 are to be placed into closed or open position. A thick coating of silver on the ends of respective contact levers 15, 16 provides for smallest possible contact resistance.

The contact levers 15, 16 which, together, form the movable contact K1 of the regulating transformer, open and close in directions perpendicular to the travel of the regulating transformer assembly so that such travel is not impeded by the fixed contacts K2 mounted beside and beneath each other on the fixed wall W shown in Fig. 6. The fixed contacts K2, too, are provided with a silver coating for contact engagement of smallest possible electric resistance.

The fixed contacts K2 are connected with resilient connector straps 25, 26 which are fastened to the current supply buses leading to the phase U of the furnace.

It will be apparent to those skilled in the art, upon a study of this disclosure, that my invention permits of various modifications with respect to details in circuitry and design, and hence may be embodied in devices other than those particularly illustrated and described herein, without departing from the essential features of my invention and within the scope of the claims annexed hereto.

I claim:

1. A system for controlling the supply of alternating current to heavy current-duty resistance furnaces, comprising a regulating transformer device having two magnetically separate cores and having on each core a low-voltage high-current secondary and an intermediate winding, one of said cores having a high-voltage primary with terminals for connection to an alternating-current supply line, a furnace load circuit connected to said two secondaries to be energized therefrom, an intermediate loop circuit electrically interconnecting said two intermediate windings, said intermediate winding on said one core having an adjustable voltage tap in said loop circuit for controlling the voltage of said other intermediate winding, and capacitor means connected in said loop circuit in series relation to said two intermediate windings.

2. A system for controlling the supply of alternating current to heavy current-duty resistance furnaces, comprising a regulating transformer device having two cores and having on each core a low-voltage high-current secondary and an intermediate winding, one of said cores having a high-voltage primary with terminals for connection to an alternating-current supply line, an intermediate loop circuit interconnecting said two intermediate windings, said transformer device being transportable to be moved to one of the respective furnaces to be energized and having connector means for electrically connecting said two secondaries with said furnace, stationarily mounted capacitor means buses connected to said capacitor means and extending along the travel path of said transformer device, and contact means mounted on said device and engageable with said buses, said contact means connecting said capacitor means through said buses into said loop circuit in series with said two intermediate windings.

3. In a furnace control system according to claim 2, said connector means between said secondaries and said furnaces comprising a high-current disconnector having movable parts mounted on said transformer device and having a group of stationary contact parts for each of said furnaces, said groups being mounted in fixed relation to the respective furnaces to be energized, and said movable contact parts being conductively engageable with one of said groups of stationary contacts depending upon the travel position of said transformer device.

4. In a furnace control system according to claim 2, said contact means for connecting said stationary capacitor means into said loop circuit comprising a disconnect switch mounted on said transformer device and glidingly engageable with said buses.

5. A system for controlling the supply of alternating current to high-duty resistance furnaces, comprising a regulating transformer device having two cores and having on each core a low-voltage high-current secondary and an intermediate winding, one of said cores having a high-voltage primary, said transformer device being displaceable along a given travel path for connection to one of the respective furnaces to be energized, high voltage buses extending parallel to said travel path, disconnect switches mounted on said transformer device to travel together therewith and being engageable with said respective buses for energizing said primary of said transformer, connector means mounted on said transformer device for electrically connecting said two secondaries with said furnace, stationarily mounted capacitor means buses connected to said capacitor means and extending along the travel path of said transformer device, and contact means mounted on said device and engageable with said buses, said contact means connecting said capacitor means through said buses into said loop circuit in series with said two intermediate windings.

6. In a furnace control system according to claim 3, said disconnector having said movable contact parts located in vertical relation to said stationary contact parts, and said movable contact parts being displaceable into and out of contact engagement with said stationary contact parts in a direction transverse to the travel of said transformer device, whereby said transformer device is freely displaceable in its travel direction when said movable contact parts are in open positions.

7. In a furnace control system according to claim 6, said disconnector comprising for each of said stationary contact parts a pair of said movable contact parts located above and below said stationary part respectively and linked with each other to simultaneously press from above and below against said stationary part with the same pressure when in closed positions.

References Cited in the file of this patent

UNITED STATES PATENTS

| | | |
|---|---|---|
| 1,107,478 | Bayard | Aug. 18, 1914 |
| 2,004,613 | Meacham | June 11, 1935 |
| 2,365,722 | Owen | Dec. 26, 1944 |
| 2,395,977 | Sidney | Mar. 5, 1946 |